United States Patent [19]

Nordbrock et al.

[11] 4,409,539

[45] Oct. 11, 1983

[54] SELF-EXCITATION FOR AN ALTERNATOR OF THE LOW-CARBON STEEL ROTOR TYPE

[75] Inventors: Raymond E. Nordbrock, West Chicago; Kirk A. Sievers, Roselle, both of Ill.

[73] Assignee: Motorola Inc., Schaumburg, Ill.

[21] Appl. No.: 242,864

[22] Filed: Mar. 12, 1981

[51] Int. Cl.³ .............................................. H02P 9/08
[52] U.S. Cl. ...................................... 322/28; 322/60; 322/73
[58] Field of Search ............... 322/28, 60, 73; 320/64, 320/68

[56] References Cited

U.S. PATENT DOCUMENTS

| | | | |
|---|---|---|---|
| 3,378,753 | 4/1968 | Poppinger et al. | 322/28 |
| 3,548,288 | 12/1970 | Wyles | 322/28 |
| 3,585,490 | 6/1971 | Zelina | 322/28 |
| 3,611,112 | 10/1971 | Lehinhoff | 322/28 |
| 3,619,761 | 11/1971 | Nagae | 322/25 |
| 3,982,169 | 9/1976 | Cummins | 322/28 |
| 4,087,736 | 5/1978 | Mori et al. | 322/28 |
| 4,222,001 | 9/1980 | Kofink | 322/60 |
| 4,223,368 | 9/1980 | Santis et al. | 361/18 |
| 4,297,631 | 10/1981 | Nicol et al. | 320/64 |

Primary Examiner—R. J. Hickey
Attorney, Agent, or Firm—James W. Gillman; James S. Pristelski

[57] ABSTRACT

A charging system for amplifying AC output voltages induced in at least one stator winding of an alternator by residual magnetism from a low carbon steel rotor to self-excite the charging system by means of the residual magnetism at low engine RPM. An electronic voltage regulator is responsive to small AC output voltages from the stator winding, even below voltage levels required to forward bias a silicon semiconductor junction, to fully energize the field winding of the alternator. Since the voltage regulator is responsive to alternator signal developed at low engine RPM, the regulator can also be used as a sensor to indicate an operative engine condition, such as start up.

6 Claims, 1 Drawing Figure

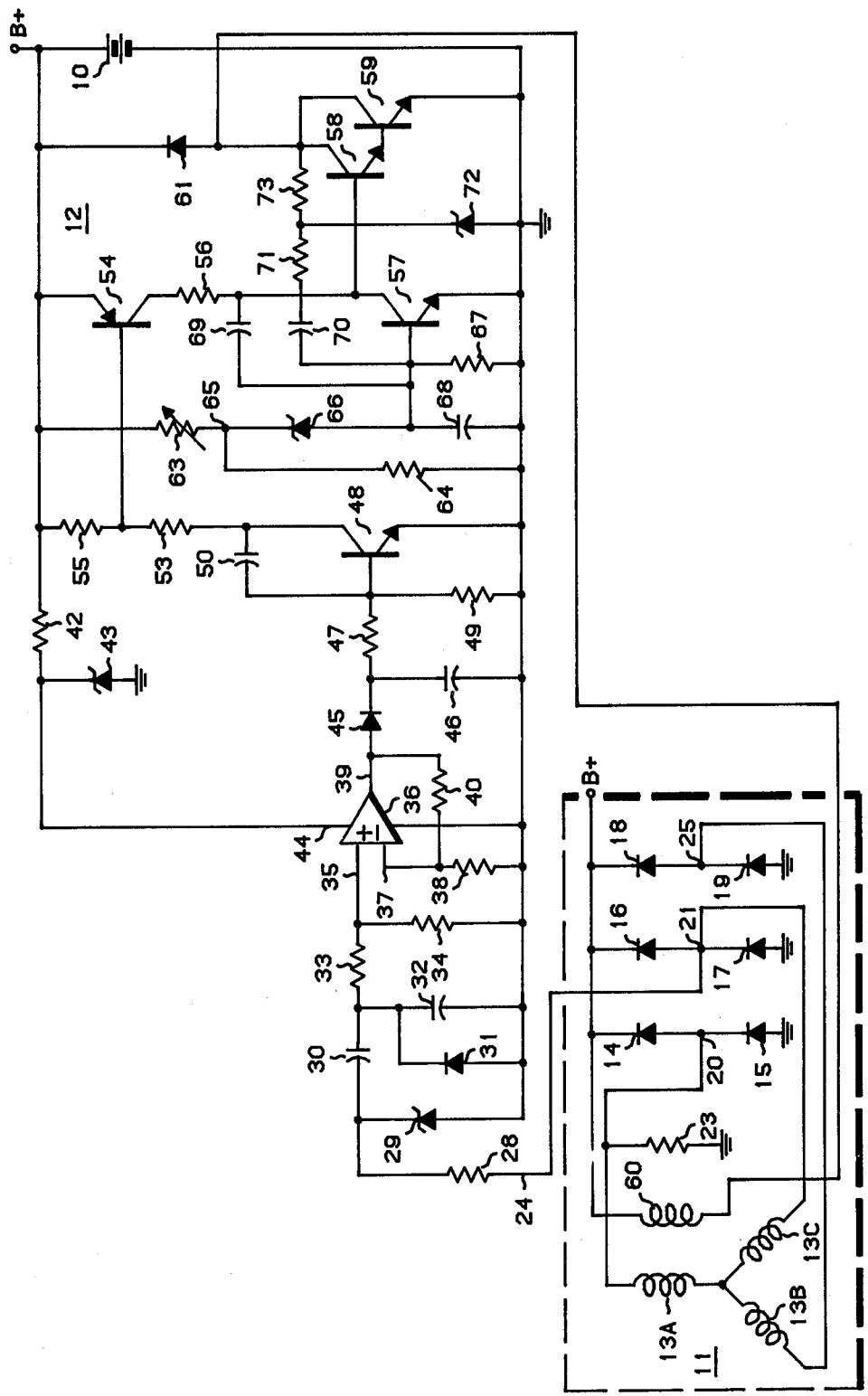

SELF-EXCITATION FOR AN ALTERNATOR OF THE LOW-CARBON STEEL ROTOR TYPE

BACKGROUND OF THE INVENTION

This invention pertains to self-excitation of the alternator in a motor vehicle charging system, and more particularly, to a self-excited charging system using an alternator of the low-carbon steel rotor type and an electronic voltage regulator which is sufficiently sensitive to respond to electrical signals developed from residual magnetism in the alternator to self-excite the alternator at low engine RPM.

One technique known to the prior art to excite an alternator is to provide an excitation current or the like into the field winding of the alternator during start-up or during low engine RPM. Such an arrangement, however, frequently requires an extra set of contacts in the ignition switch which necessarily adds to the cost of the charging system and also adversely affects charging system reliability. An extra wire or connection in the charging system is also frequently required when using this technique.

Other techniques have also been used to self excite the alternator of the charging system and to minimize the number of connections in the charging system. Another such technique is the use of high carbon steel in the rotor core of the alternator. The high carbon steel provides more residual magnetism and therefore a correspondingly higher electrical signal during start-up of the alternator which may then be utilized to self-excite the alternator. However, high carbon steel in the rotor lowers the permeability of the rotor iron. This lower permeability means that there will be less magnetic flux for given conditions compared to the use of low carbon steel. The lower permeability of high carbon steel in the rotor also necessarily means that the output current capability of the alternator is reduced compared to the use of a similar amount of low carbon steel. The output of the high carbon steel type rotors may of course be increased by adding extra steel, but this is under a weight and cost penalty in order to provide the same output current capability.

High carbon steel rotor cores are used in the prior art to take advantage of the residual magnetism present in the alternator to provide a signal of sufficient magnitude to overcome the input threshold in the voltage regulator for the alternator and/or the forward bias potential of the typical diode trio. The voltage regulator is typically referenced to ground and is biassed from the battery which is most commonly a positive voltage supply. Voltage regulators therefore typically have an input threshold voltage which must be reached and exceeded in order to provide an output signal suitable for energizing the alternator field coil. Typically, the voltage signal resulting from the residual magnetism is rectified as by a diode trio, and then supplied to the input of the voltage regulator. This means that there is at least one forward biassed silicon diode drop in the diode trio, which is typically 0.7 volts for a silicon diode. Additionally, as mentioned above, the voltage regulator input may also have some threshold level before activation. Typically, the input stage to a voltage regulator has an NPN type transistor with its emitter referenced to ground and the base terminal thereof coupled to the input terminal of the voltage regulator. This means that yet another semi-conductor must be forward biased in order to activate the electronic voltage regulator. For an NPN type transistor with its emitter referenced to ground and the base terminal coupled to the input terminal of the voltage regulator, another 0.7 volt drop will be needed to forward bias the base to emitter junction of the NPN transistor. These voltage drops necessarily translate into significant engine RPM before the residual magnetism in the alternator will provide a sufficiently large signal that may be rectified and applied to the input of the voltage regulator to activate the regulator. For example, in self-exciting charging systems utilizing an alternator of the high carbon steel rotor type, it is not at all unusual for engine RPM to have to exceed 1,000 before the voltage regulator will sufficiently energize the field winding of the alternator and enable the alternator to cut in. Since approximately a 2:1 pulley ratio is commonly employed between the engine and the alternator, 1000 engine RPM translates into about 2000 alternator RPM. If the engine of the charging system in which the alternator is installed should hesitate or otherwise begin to stall, the engine RPM may drop sufficiently that the alternator may cut out and the minimum engine speed for alternator cut in may again have to be exceeded before the charging system is again self-excited.

SUMMARY OF THE INVENTION

Accordingly, it is a principal object of the present invention to provide a charging system including an alternator of the low-carbon steel rotor type and an electronic voltage regulator which is sufficiently sensitive to the alternator signals induced by residual magnetism in the alternator to self-excite the charging system at low engine RPM.

A related object of the present invention is to provide an electronic voltage regulator having an input coupled to at least one of the stator windings of an alternator of the low-carbon steel rotor type which is responsive to AC output voltages of a lower magnitude than that of a forward biased silicon semiconductor junction such that the electronic voltage regulator may begin to excite the field winding of the alternator at lower engine RPM, such as during engine start up.

A further object of the present invention is to provide an electronic voltage regulator which is responsive to the AC voltages of the stator windings of the alternator down to electrical noise levels, as well as to the AC signals from the stator windings during maximum engine RPM, and to all operating conditions therebetween.

Briefly, the charging system of the present invention is of the self-excited type including an alternator having a low-carbon steel rotor core. An electronic voltage regulator has its input coupled to at least one of the stator output windings of the alternator and is responsive to the AC output voltages provided thereby. The electronic voltage regulator has an input threshold which is lower than that of a forward biassed silicon semiconductor junction such that the electronic voltage regulator is sensitive to electrical signals from the stator windings of the alternator resulting from residual magnetism in alternator during low engine speeds, particularly during engine start up. The input stage of the electronic voltage regulator amplifies the AC output voltages of the stator windings of the alternator, including those small electrical signals induced by residual magnetism in the alternator, and applies the amplified AC signals to a peak detector. The output signal from the peak detector is then applied to a DC amplifying and regulating stage which provides a regulated DC output signal to energize the field coil winding of the alternator. The input stage of the electronic voltage regulator is preferably responsive to only one polarity of the AC signal from the stator windings of the alternator to energize the field coil of the alternator, while rejecting the opposite polarity portion of the AC signal from the stator windings. The input stage of the electronic voltage regulator is also filtered to provide immunity to radio frequency interference and other types of noise.

BRIEF DESCRIPTION OF THE DRAWING

The single drawing FIGURE is a schematic diagram illustrating the charging system of the present invention.

DESCRIPTION OF THE PREFERRED EMBODIMENT

Referring to the single drawing FIGURE, there is shown a charging system for a direct current battery 10 including an alternator, generally designated 11, and a voltage regulator, generally designated 12.

Alternator 11 is shown with its stator windings 13A, 13B and 13C connected in the well-known wye connection. Associated with stator windings 13A, 13B and 13C is a stator core (not shown) which is typically fabricated from iron or steel sheet laminations. The stator windings are then wound about the assembled laminations of the stator core in a manner well known to the prior art. Optionally, the stator windings 13A, 13B and 13C may be connected in the well known delta configuration. The voltage regulator 12 of this invention is adaptable to either type of stator winding connections.

As mentioned above, the rotor core of alternator 11 is preferably of low carbon steel. Low carbon steel is prefered since it has a higher permeability and therefore will provide a higher current output capability for alternator 11 than for the same amount of high carbon steel. Expressed another way, to provide an alternator having a desired current capability output, a smaller amount of low carbon steel is required as compared to high carbon steel. Low carbon steel cores are therefore much preferred in manufacturing alternators since the rotor core can be of reduced size and weight as compared to the use of a high carbon steel core. Of course, low carbon steel for the rotor core is also more malleable and therefore easier and less expensive to manufacture. The advantage of high carbon steel is that it provides more residual magnetism, but this is at a sacrifice in magnetic permeability. As discussed above, a high permeability type rotor core is often required by prior art voltage regulators in order to provide a charging system of the self-exciting type in which the alternator cuts in when the engine driving the alternator reaches sufficient RPM that the AC signals induced by residual magnetism in the stator windings become sufficient in magnitude to activate the electronic voltage regulator.

In the wye connection depicted in the drawing figure, the ends of stator windings 13A, 13B and 13C which are not commonly connected are brought out for connection to a full wave rectification bridge including diodes 14, 15, 16, 17, 18 and 19, also in a manner well known to the prior art. The diode bridge rectifies AC voltages from stator windings 13A, 13B, and 13C to provide charging current to the B+ line which is also connected to the positive terminal of battery 10. A tap 21 between diodes 16 and 17 is brought out as an input to the voltage regulator 12 on line 24. One of the other taps 20 is referenced to ground through a resistor 23. Resistor 23 is shown as internal to the alternator 11, but may optionally be located in regulator 12. Resistor 23 is of a sufficiently high resistance so as to not appreciably load winding 13A, but to also present the potential across windings 13A and 13C to the input of regulator 12 without any semiconductor junction potential drops. It will be appreciated by those skilled in the art that the input on line 24 from tap 21 may be interchanged with tap 25 between diodes 18 and 19 and that resistor 23 may be on one of the other taps provided that line 24 and resistor 23 are not on the same tap. This is because the signals from the stator windings 13A, 13B, and 13C of alternator 11 are alternating current (AC) signals and each of windings 13A, 13B, and 13C are usually physically identical such that the output of the respective windings differs only in phase. Thus, while the output of the winding pairs 13A and 13C have been selected for the input to regulator 12, other pairs of stator windings may alternatively be selected.

In the embodiment shown, the AC signal at tap 21 of the full-wave rectification bridge is routed by line 24 to an input resistor 28 of the electronic voltage regulator 12. The other end of resistor 28 is connected to the cathode terminal of a zener diode 29. The anode terminal of zener diode 29 is referenced to ground. Also connected to the cathode terminal of zener diode 29 is a capacitor 30 which has its other terminal connected to the cathode of a diode 31, a capacitor 32 and a resistor 33. The anode terminal of diode 31 and the other terminal of capacitor 32 are both referenced to ground. The other end of resistor 33 is connected to another resistor 34 and to a non-inverting input 35 of an integrated circuit operational amplifier 36. The other terminal of resistor 34 is referenced to ground. Operational amplifier 36 has an inverting input 37 which is referenced to ground through a resistor 38 and to the output 39 of operational amplifier 36 through another resistor 40.

Zener diode 29 will pass the positive portion of the AC signals present at its cathode, provided that the zener voltage of about 13.0 volts is not exceeded, through capacitor 30 to a resistor divider formed by resistors 33 and 34. Of course, for sufficiently negative input signals, zener diode 29 will be forward biassed and limit the signals at its cathode to about −0.7 volts. Diode 31 further limits the negative voltage at the node between capacitor 30 and resistor 33 to about −0.7 volts. Capacitor 32 filters radio frequency interference and other types of noise. The resistor divider formed by resistors 33 and 34 functions to limit the voltage applied to non-inverting input 35 of amplifier 36 to about −0.3 volts for protection of amplifier 36 from excessive negative voltage levels.

Resistors 38 and 40 which are connected to inverting input 37 of amplifier 36 determine the voltage gain of amplifier 36 and are typically selected for a voltage gain of about 50. It is desirable to have a voltage gain in the range of about 50 so that small AC voltage signals, such as those induced in stator windings 13A, 13B and 13C of alternator 11 by residual magnetism during low engine RPM or during engine start-up can be sufficiently amplified to activate the electronic voltage regulator 12 while at the same time avoiding amplification of noise. Operational amplifier 36 is preferably of the type which may be operated from a single polarity voltage supply and referenced to ground so that it is not necessary to supply an opposite polarity voltage for biassing purposes. Amplifier 36 is of the differential type that will amplify any potential difference between its input terminals 35 and 37. Since terminal 37 is referenced to ground through resistor 38, amplifier 36 will be responsive to any non-zero potential at non-inverting input 35 to provide an amplified signal output at output terminal 39. A preferred part number for amplifier 36 is MC258 which is commercially available from Motorola, Inc., Phoenix, Ariz.

Amplifier 36 is biassed from the positive battery terminal B+ through a resistor 42 to the cathode terminal of a zener diode 43 which regulates the bias voltage on a line 44 to the amplifier 36. Zener diode 43 protects amplifier 36 from any over voltage transients or noise.

The output 39 of amplifier 36 is connected to the anode terminal of a rectifying diode 45. The cathode terminal diode 45 is connected to a capacitor 46 which has its other end referenced to ground, and to a resistor 47. The other terminal of resistor 47 is connected to the base terminal of a transistor 48, to one terminal of a resistor 49, which has its other terminal referenced to ground, and to a capacitor 50. Capacitor 50 has its other terminal connected to the collector of transistor 48 to take advantage of the well-known Miller effect connection between the base and collector terminals of a transistor to provide more effective filtering.

Diode 45 and capacitor 46 together form a peak detector for the output 39 of amplifier 36. Positive pulses on output 39 of amplifier 36 will be passed by diode 45 to charge capacitor 46. However, negative pulses and that portion of positive pulses which are not greater than the voltage on capacitor 46 will not be passed by diode 45 since it will be reverse biassed or at least not sufficiently forward biassed. The output of this peak detector is provided by resistor 47 to the base terminal of NPN type transistor 48. The characteristics of the peak detector are chosen to keep transistor 48 in an on state or in a saturated condition above a predetermined alternator RPM set by the circuit gain; for example, 250 alternator RPM. Resistor 47 limits the base drive to transistor 48 and together, resistors 47 and 49 provide a discharge path for capacitor 46.

The aforedescribed circuitry between resistor 28 and transistor 48 constitutes the input stage for voltage regulator 12, including resistors 24, 33, 34, 38, 40, 47 and 49, capacitors 30, 34, 46 and 50, zener diode 29, diodes 31 and 45, operational amplifier 36, and transistor 48.

Transistor 48, which has its emitter terminal referenced to ground, has its collector terminal connected through a resistor 53 to the base terminal of a PNP type transistor 54. A resistor 55 is connected across the base to emitter junction of transistor 54 to provide a path for collector leakage currents of transistor 48. The emitter terminal of transistor 54 is referenced to the positive battery supply line B+ and the collector terminal thereof is connected through a current limiting resistor 56 to the collector terminal of an NPN transistor 57 and to the base terminal of another NPN transistor 58. Transistor 58 has its emitter terminal connected to the base terminal of another NPN transistor 59 with the emitter terminal of transistor 59 referenced to ground. The collectors of transistors 58 and 59 are both connected to one terminal of a field winding 60 for alternator 11 and to the anode terminal of a free wheeling diode 61. The cathode of diode 61 and the other terminal of field winding 60 are both connected to the supply voltage B+ line. Thus, when transistor 48 is turned on into a saturated condition in response to a peak detected positive pulse from amplifier 36, PNP transistor 54 is also turned on which in turn turns on NPN type transistors 58 and 59 to energize field winding 60.

Field winding 60 typically is wound from a wire which is sized to provide a small amount of resistance, for example about 4 ohms, such that the amount of current conducted by transistors 58 and 59 through winding 60 will be self limited. Alternately, a small amount of separate resistance may be provided in series with winding 60. Free wheeling diode 61 is reversed biassed and therefore non-conductive during conductive or ON states of transistors 58 and 59. Diode 61 becomes conductive during OFF states of transistors 58 and 59 to provide an inductive current path for winding 60 in a manner well known to the prior art.

Transistor 57 regulates the amount of energization to coil 60 by diverting some of the base current drive from transistor 58, which is provided by transistor 54, to ground. This shunting action of transistor 57 is in response to the voltage level of the B+ line. A variable resistor 63 and a fixed resistor 64 are series connected between the B+ line and ground and form an adjustable voltage divider. A node 65 between resistors 63 and 64 is connected to the cathode terminal of a zener diode 66 which has its anode terminal connected to the base of transistor 57. The anode terminal of zener diode 66 is further referenced to ground through a resistor 67. A filtering capacitor 68 is in parallel with resistor 67. Another capacitor 69 is connected between the base and collector terminals of transistor 57 to provide effective filtering in accordance with the well-known Miller effect connection.

Thus, when the charging system is operating and sufficient current is being supplied by alternator 11 to battery 10, at some point the B+ line connected to the positive terminal battery 10 will reach a voltage which will render zener diode 66 conductive to turn on transistor 57 to regulate excitation of field winding 60 and therefore the amount of alternator output current. Resistor 63 is variable to adjust the desired threshold voltage at which the charging system will be self-regulating.

A feedback network is provided between transistor 57 and transistors 58 and 59 to provide further frequency stability and noise filtering for the voltage regulator. A capacitor 70 is connected in series with a resistor 71 between the base terminal of transistor 57 and the cathode terminal of a zener diode 72 which has its anode referenced to ground. The cathode terminal of zener diode 72 is also connected through another resistor 73 to the collector terminals of transistors 58 and 59. This feedback circuit aids in controlling the duty cycle and frequency of current in the field winding 60 of the alternator 11. The feedback circuit further minimizes the effect of voltage spikes and ripple on the feedback current. This feedback circuit is further disclosed in U.S. Pat. No. 4,223,363 to Santis et al., which is assigned to the assignee of the present invention.

It will now be appreciated by those skilled in the art that a significant advance in the charging system arts has been attained. A self-excited charging system has been developed which can make use of an alternator with a low carbon steel rotor which is much preferred over the high carbon steel type for the previously stated reasons. Due to the characteristics of the disclosed voltage regulator, full field winding excitation of the alternator may be accomplished at speeds considerably below normal engine operating speeds by use of AC voltages induced into the stator windings by residual magnetism in the rotor core. This can be accomplished at alternator speeds at least as low as 250 RPM, which translate into engine speeds at least as low as 125 RPM when employing the common 2:1 pulley ratio between the engine and alternator. The present invention also completely illiminates the needs for a conventional diode trio in the alternator.

Of course, those skilled in the art may find additional advantages or features in the present invention. For example, the present invention may also be employed as an engine speed sensor, since at engine speeds below about 125 RPM transistor 48 will be intermittently conductive and above an engine speed of about 125 RPM transistor 48 will be full ON or saturated. The output of transistor 48 at its collector terminal may therefore be used as a signal that the engine is beginning to run, i.e., that the engine has achieved a speed of about 125 RPM which is above normal cranking speeds, but also below normal idle speeds. Such types of sensors are often needed in more sophisticated engine control systems as well as in diesel engines.

While an embodiment of the present invention has been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

We claim:

1. A charging system for amplifying AC output voltages induced in at least one stator winding of an alternator by residual magnetism in the alternator rotor and energizing a field winding of the alternator at low alternator rotational speeds to self-energize the charging system by means of the residual magnetism, said charging system comprising:

an alternator having at least one stator winding wound on a core, the alternator further having a field winding wound on a low carbon steel core and in operative proximity to said stator winding to provide an electromagnetic field for said stator winding;

electronic voltage regulator means having at least one input terminal coupled to said stator winding of the alternator, the electronic voltage regulator means comprising an operational amplifier having one of its input terminals coupled to the input terminal of the electronic voltage regulator means, the operational amplifier providing an amplified output AC signal at its output terminal, peak detector means coupled to the output terminal of the operational amplifier to peak detect the magnitude of the amplified AC output signal, and circuit means coupled to the peak detector means and responsive to the output of the peak detector means to develop the output signal of the electronic voltage regulator means, whereby the electronic voltage regulator means is responsive to small AC output voltages induced into the stator winding by residual magnetism during low alternator speeds, such as during start-up, to develop an output signal at an output of the electronic voltage regulator means of sufficient magnitude to fully excite the alternator field winding even when said small AC output voltages are of lower magnitude than that required to forward a silicon semiconductor junction; and coupling means to couple the output signal of the electronic voltage regulator means to said field winding of the alternator.

2. The charging system as in claim 1 wherein the input to said operational amplifier includes clipping means to clip one polarity portion of said AC output voltages from the said at least one stator output winding prior to amplification of the AC output voltage by the operational amplifier.

3. The charging system as in claim 1 wherein the input to said operational amplifier further comprises filtering means to filter the AC output voltages applied to the input of said operational amplifier.

4. An engine speed sensor to indicate an operative engine condition, such as start-up, said sensor comprising:

an alternator having at least one stator winding wound on a core, and a rotor having residual magnetism in operative and rotational proximity to said stator winding to induce AC output voltages into said stator winding during rotation of said rotor by an engine; and electronic voltage regulator means having at least one input terminal coupled to one stator winding of the alternator, the electronic voltage regulator means comprising an operational amplifier having one of its input terminals coupled to one of the input terminals of the electronic voltage regulator means, the operational amplifier providing an amplified output AC signal at its output terminal, peak detector means coupled to the output terminal of the operational amplifier to peak detect the magnitude of the amplified AC output signal from said operational amplifier, and circuit means coupled to the peak detector means and responsive to the output of the peak detector means to develop the output of the electronic voltage regulator means, whereby the electronic voltage regulator means is responsive to the AC output voltages induced into the stator winding by residual magnitism during low alternator speeds to develop an output signal indicative that the engine has reached a predetermined speed which is greater than the normal cranking speed but less than the normal engine idling speed.

5. The engine speed sensor as claimed in claim 4 wherein the input terminal to said operational amplifier is also coupled to clipping means to clip one polarity portion of said AC output voltages from the stator winding prior to amplification of the AC output voltage by the operational amplifier.

6. The engine speed sensor as claimed in claim 4, wherein the input terminal to said operational amplifier is further coupled to filtering means to filter the AC output voltages applied to the input terminal of said operational amplifier.

* * * * *